Nov. 29, 1966 P. PLÜCKEBAUM 3,288,427
ASSEMBLABLE FORMWORK FOR REINFORCED CONCRETE STRUCTURES
Filed July 8, 1964 7 Sheets-Sheet 1

Nov. 29, 1966 P. PLÜCKEBAUM 3,288,427
ASSEMBLABLE FORMWORK FOR REINFORCED CONCRETE STRUCTURES
Filed July 8, 1964 7 Sheets-Sheet 5

| United States Patent Office | 3,288,427
Patented Nov. 29, 1966 |

3,288,427
ASSEMBLABLE FORMWORK FOR REINFORCED
CONCRETE STRUCTURES
Paul Plückebaum, Am Sandacker 22,
Dusseldorf-Hamm, Germany
Filed July 8, 1964, Ser. No. 381,177
Claims priority, application Germany, July 10, 1963,
P 32,174; May 23, 1964, P 34,319; June 18, 1964,
P 23,600
15 Claims. (Cl. 249—192)

My invention relates to an assemblable formwork for reinforced concrete structures, and more particularly to the erection of supports or columns, ceilings and ceiling beams or girders of building structures.

The method employed in the conventional construction of formworks or shuttering for reinforced concrete structures has been first to erect a form frame or scaffolding and then mount the formwork for the ceiling and the ceiling means thereon. The form scaffolding or framework consists mostly of wooden supports or columns to which there are nailed squared timbers extending in several directions and having a spacing from one another which depends on the size of the form boards or form panels to be applied thereto. The wooden columns are reinforced on all sides against shearing effects. After the framework is raised, suitably hammered-together form boards or form panels for the ceilings and the beams are applied. If necessary, suitably shaped form boxes are constructed which can be installed in the form framework. Additional bracings, spacer supports, ferrules, gussets and the like can be applied or nailed as reinforcement. The rough form boards undergo a pretreatment with form oil many times before pouring of the concrete. Where concrete surfaces are to be seen, special plywood with a smooth surface is installed in the formwork. After the introduction of the reinforced concrete and a suitable time for hardening thereof, or setting time, has elapsed, dismantling of the formwork is begun by removing the form scaffolding and loosening or detaching the wooden panels from the concrete with crowbars or suitable hand tools. The panels are again separated into boards from which the nails are removed and any clinging concrete is cleaned. The concrete from which the formwork has been dismantled, then generally has a relatively rough surface and especially at those places where the abutting sides or butt joints of the form boards were located, ledges or projections show up clearly in the concrete. Accordingly, the usual concrete surfaces that are formed must always be polished subsequently. It is therefore understood that the afore-described framework for reinforced concrete structures employed till now is normally associated with a considerable time and material loss such as particularly for cutting or sawing wood, for milling, for splicing and the like, which in the aggregate presents an appreciable cost factor. There has been no essential change in this cost factor by changing over in recent times to the use of form supports or carriers on which the form for the ceiling and the ceiling beams was propped up or placed instead of the relatively troublesome form scaffolding that had to be erected. For this purpose, squared timbers are disposed on the form supports and the beams and props or columns are constructed.

There are also known assemblable formworks for reinforced concrete structures, the form elements of which have different shapes, such as form plates or panels, extension or elongation panels or adjusting or leveling panels, connecting or corner bars or rails and the like. These elements have at least two parallel oppositely disposed edges which are provided with retaining ledges or strips located on the side of the element reverse from the side having the form surface that engages wet concrete, and by means of these ledges the associated retaining elements are directly held together. Although such a formwork is of relatively great adaptability or versatility and can also be used repeatedly, it is nevertheless not free from other material faults: In the known formwork the form elements consist of steel sheet-metal panels squared off at the ends, which not only have relatively great weight and are therefore difficult to handle, but also because of the roundings off on chamfering at their squared-off edges necessary during their production do not of necessity permit smooth i.e. joint- or seam-free, form-surface development. Furthermore, the steel form is susceptible to corrosion, and also with increased size tends toward greater adherence of the poured concrete. Since the joining of these individual steel form panels is effected conventionally by screw bolts inserted through squared-off flat side flanges abutting one against the other, numerous holes for receiving the inserted bolts must be provided in the side flanges and complex assembly operations must be undertaken in order to erect the formwork. Also, before assembly, the side flanges of the steel form panels must always be carefully cleaned of dirt and concrete deposits located thereon since otherwise correspondingly widely spaced butt joints would be formed.

Objects of my invention are to provide an assemblable formwork for reinforced concrete structures in which the form elements that are to be assembled are of unitized construction, are corrosion resistant and for very different and also adequately small measurements are accurately manufactured so that they for the greatest possible adaptability to the respective desired reinforced concrete structure can be correctly aligned or oriented and can form a smooth form surface which affords such a high quality concrete finish as so-called visible concrete or concrete that is to be in view. Due to their great corrosion resistivity and their resistivity against wearing or abrasion, the form elements can be used many times over.

It is also an object of my invention to provide form elements that have a lighter weight and are consequently much more convenient for handling.

It is another object of my invention to provide individual form elements that can be fabricated comparatively economically and can be made with sharp edges especially if they are produced by means of an extrusion press process on an aluminum base.

Another object of my invention due to the fact that elongated edges formed in a bifurcated cross section may be simply joined and securely clamped to one another without introducing a weakening of the cross-sectional outline at the junction, is to thereby provide a solid form of relatively great stiffness or rigidity and exceeding smoothness of the form surfaces with relatively thin profile wall thicknesses.

It is also an object of my invention to provide an assemblable formwork for reinforced concrete structures, particularly for erecting props or columns, ceilings and support beams for building superstructures, which is of even greater adaptability than the known formworks and can be used repeatedly without presenting the aforedescribed disadvantages of the known formworks.

With these objects in view and in accordance with my invention, I provide form elements consisting of light metal or plastic sections or components including form panels, extension or elongation panels, or leveling or adjusting panels possessing a bifurcated cross section at their edges which carry the support ledges. The longitudinal groove or notch of the bifurcated cross section is adapted to receive suitably formed marginal ledges or strips of connecting or corner bars that are inserted therein in the nature of a tongue-and-groove connection, and the joining of the form elements consequently takes place by means of the locking clamps clasping together the ledges of the bifurcated cross section. The novel form elements are advantageously fabricated by an extrusion-press process on an aluminum base.

In accordance with other aspects of my invention, angle bars or rails joining the form sections to one another are constructed with a stepped profile or outline or with a hollow cross section having many squared-off edges. The corner bars or rails can also have a gable-roof cross section with respectively two marginal support ledges located on both sloping sides, the support ledges ensuring a suitable connection or junction by being simply inserted between form sections located at right angles to one another and by simply clamping the same. Instead of special corner rail junctions, individual form sections can also be constructed as corner sections of angular cross section, whose peak edge or apex is braced or stiffened with a hollow rib which is provided with recesses for suspending support brackets. These corner rails have a great load capacity or strength. The support brackets that are to be hung thereon afford a great many attachment or bracing possibilities.

In accordance with another aspect of my invention, the support ledges of a form section have at their sides facing one another an undercutting or recess, between which extension or angle lashings or straps having trapezoidal cross section can be inserted dovetailed. These straps afford an additional junction strength between the individual form sections. The carrying capacity or rigidity against bending thereof is thereby further increased since the straps simultaneously act as reinforcing rails and in accordance with the requirement are respectively inserted at a selected location between the support ledges of the form section.

According to a further aspect of the invention, the form sections are provided with hollow ribs on the side opposite to the side facing the form surface of the concrete, through which a heating medium, such as warm air for example, is conducted. In this way, the setting time of the concrete can be materially shortened, a characteristic which is of great significance in the art.

In accordance with an additional aspect of my inventions, I provide tie traps consisting advantageously of plastic, particularly extending through a suitable aperture in the form sections provided for the ceiling form. These tie straps are to be embedded in the concrete being formed and are destructible from the outside for the purpose of loosening the form section. It is thereby ensured that the form sections, after harding of the concrete, remain as long in contact engagement with the latter as is desired during disassembly of the formwork, i.e. that it cannot fall down and thereby cause an accident, until the tie straps are unclamped, cut or separated in a similar manner or destroyed from the outside.

Yet another aspect of my invention is that the form panels or boards on their underside opposite to the side facing the form surface of the concrete are provided with T- or L-shaped reinforcing ribs between which substantially U-shaped insert sections are insertable. In this way, the wall thickness of the form panels can be kept even narrower without loss of the form panel strength or rigidity. Consequently, the form panels are constructed with a relatively greater saving in weight and are thereby even better to work with or to manipulate. The aforedescribed insert sections can thus be used as longitudinal or transverse joining means for the form panels lying one behind the other or abutting transversely against one another, or can also be inserted at specially stressed or loaded form locations as additional stiffening or reinforcing elements.

In accordance with another aspect of the invention, I have also provided for mutual clamping and additional reinforcing of the form panels that are assemblable to selected formwork shapes, securing clamps consisting of flat or angular sections cooperating with one or more screw bolts provided with a nut having a parallelogram shape of unequal sides. The nuts are threaded on the screw bolts in insert compartments of the form panels and, after suitable rotation thereof about the axis of the screw bolt, the nuts with the parallel sides thereof spaced farther from each other interlocks or abuts against the T- or L-shaped reinforcement ribs of the form panels. A support clamp with a flat or angular section of the thus constituted type permits an extraordinarily simply made and nevertheless highly secure clamping or stiffening of the joined form panels since the nuts having the shape of parallelograms have to be inserted only in the respective insert compartments between the T- or L-shaped reinforcement ribs of the form panels and their screw bolts suitably tightened. The sides of the parallelogram-shaped nuts spaced farther apart from each other are thus placed behind the T- or L-shaped reinforcement ribs provided on the form panels.

In accordance with an additional aspect of my invention, I provide an elongated force transferring member against the flat or angle sections or rails so as to be braced or secured by the screw bolts with the parallelogram-shaped nuts, for clamping or embracing several form panels inserted one in another or fitted together edge to edge. In accordance with an additional aspect of my invention, I provide for respectively two of these clamps cross pieces that are crossed at right angles or at an oblique angle and consisting of respectively two sleeves or pockets located one above the other and firmly secured to one another at the corresponding intersecting angle. A clamping tie effected in this manner and held together by means of the cross pieces can be assembled exceedingly simply. It can be used chiefly for the encircling or embracing or locking of support or column forms and equally as well also for ceiling support forms.

Other aspects and features that are considered as characteristic for the invention are set forth in the appended claims.

Although the invention has been illustrated and described as embodied in assemblable formwork for reinforced concrete structures, it is nevertheless not intended to be limited to the details shown, since various modifications and structural changes may be made therein without departing from the spirit of the invention and within the scope and range of equivalents of the claims.

The construction and relative operation of the invention, however, together with additional objects and advantages thereof will be best understood from the following description of specific embodiments when read in connection with the accompanying drawings, in which:

FIG. 5 is a cross section of a formwork for lintels, window bases or beams;

FIGS. 6 and 7 show different embodiments of corner connections for the form panels;

FIGS. 8, 9, 10 and 11 show side views of various form sections;

FIG. 12 shows an additional means for connetcing the form sections;

Figures 1, 3, 4:
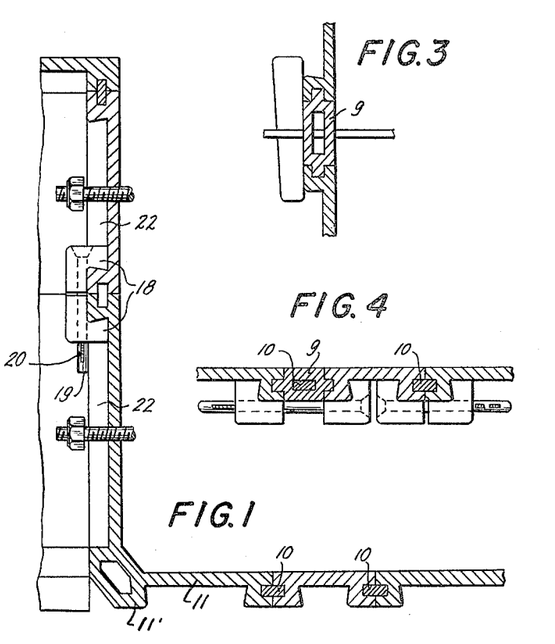
FIG. 1 is a vertical section of an embodiment of the ceiling beam form that is part of my invention.
FIGS. 3 and 4 are sectional views of an edgewise connection in the same plane of two and three form sections respectively.
Figures 5, 6, 8, 9, 10, 11, 12:
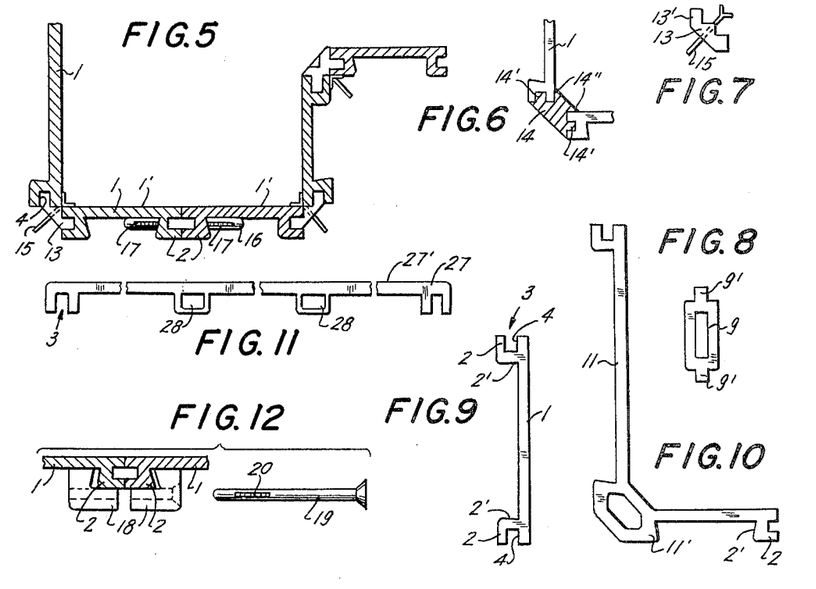

Referring now to the drawings, there is shown a novel form consisting essentially of self-supporting light metal or plastic sections whose basic shape is shown, for example, in FIG. 9 in which there is provided a flat section 1 having support ledges or rails 2 extending at two of its parallel opposing edges from the side opposite the forming side 1' of the section (see FIG. 5). These support ledges or rails 2 form with the form plate or panel 1 proper a respective bifurcated section 3 within which a longitudinal groove 4 is located. In this longitudinal groove 4 the marginal ledges or rails of correspondingly constructed extension sections, connecting rails or corner rails are to be inserted therein. Such an extension section 9 is shown, for example, in FIG. 8. The section 9 has a rectangular hollow cross section with border rails 9' located on the opposite smaller sides of the rectangular cross section. Instead of these extension sections 9, however, simple connecting rails 10 as shown in FIGS. 1 and 4 having only a rectangular cross section are inserted in the longitudinal grooves 4. Individual form sections are suitably formed as corner sections such as the corner section 11 shown particularly in FIG. 10, and which has an angular cross section and is reinforced at its apex or vertex with a hollow rib 11'. In the hollow rib 11' there are provided recesses 11" (see FIG. 15) for inserting or suspending therein suitable projections of support or holder brackets 12. Instead of the corner section 11, corner formworks as are shown in FIGS. 5, 6 and 7 may be employed, in which respectively two form sections 1 extending at right angles to one another are connected one to the other by means of a suitably constructed corner rail 13 or 14. The corner rails 13, 14 are, as shown in FIGS. 5 and 7, of stepped profile or outline. Their marginal ledges 13' as well as 14' engage in the longitudinal grooves 4 of the flat section 1 and thereby grip the same securely. In the corner rails 13 there are provided several clamping hooks 15 which are tightened after assembly and in the position shown in FIG. 5 are braced or wedged against the form sections. Even more advantageous is the corner connection shown in FIG. 6 of the form plates 1 effected by means of a corner rail section 14 having essentially a pitched-roof outline with respective marginal rails or ledges 14', 14" or both sloping sides thereof.

Figure 2:
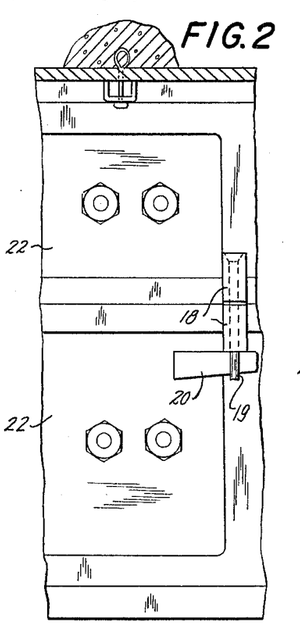
FIG. 2 is a front view partly in section of FIG. 1.

The necessary tying together of the individual form sections both at their middle connecting locations and at their corners is effected by means of suitable holder elements. These holder elements, as for example in the embodiment shown in FIG. 5, can consist of connecting bolts 16 inserted through the holder ledges or rails 2 and tightened or braced by the clamping wedges 17. Another embodiment of a holder element is shown in FIG. 12 in which the holder element is shown to consist of respectively two clamping members or brackets 18 placed against the support ledges or rails 2 and tightened by means of a clamping bolt 19 passing through suitably alinged bores in the clamping members 18 and tightened by means of the clamping wedge 20 (see also FIGS. 1 and 2).

Between the sides of the support ledges or rails 2 of the form section 1 which face one another there is thus provided an undercut or recess 2' (see FIG. 9) within which the extension or angle straps or lashings 22, 23 of trapezoidal outline are insertable as is particularly shown in FIGS. 1 and 2 and 13 and 14. Thereby the form sections 1 can be securely connected not only to one another but can also simultaneously be effectively reinforced or stiffened which is of great significance for the self-supporting method of construction of the novel form herein described.

Figure 15:
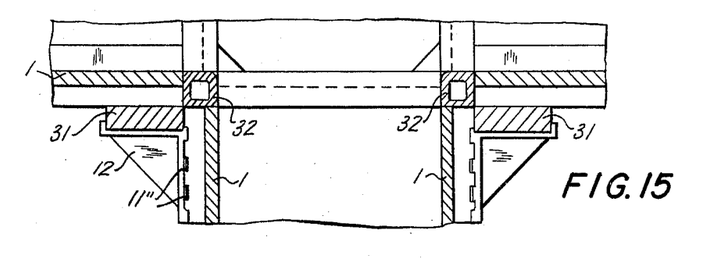
FIG. 15 is a vertical cross section through a support form with a ceiling or ceiling beam form lying thereon.

In the embodiment shown in FIG. 15, there are shown bearing plates 31 resting on brackets 12 hanging on the support form sections 1 or their corner or angle rails, the form work for the ceiling beams being placed on the bearing plates 31. The intermediate space between the form sections for the ceiling beams and the supports 1 can be filled by the box-shaped sections 32 which are for example cut in mitre.

The form sections of light metal or plastic can be assembled as a unified structure of any desired shape and can be assembled largely self-supporting. It has been shown to be of exceptional advantage to employ extruded sections on an aluminum base, since such sections are exceptionally easy to fabricate, possess light weight and afford a smooth surface. The form sections can be easily and comfortably manipulated and only a few technicians are necessary to perform the formwork. Setting up the formwork can be effected completely without the necessity of cutting or sawing and the form elements can be used over and over again, quite contrarily to the known wooden formworks. The concrete poured into the formwork and hardened has an over-all flawless or sound smooth surface, i.e. it has the quality of the so-called visible or viewing concrete and therefore does not require polishing of the concrete surface. By means of the hollow ribs provided in the form sections and by the warm air that can consequently be conducted therethrough, the hardening concrete can accordingly be warmed or heated whereby the setting time for the concrete can be materially shortened. This novel formwork system can be installed or instituted for all reinforced concrete structures, particularly for home-building, industrial building and engineering construction, to advantage. To these also belong constructions that are erected by a progressive construction process, i.e. in successive continuing stages.

Figure 16:
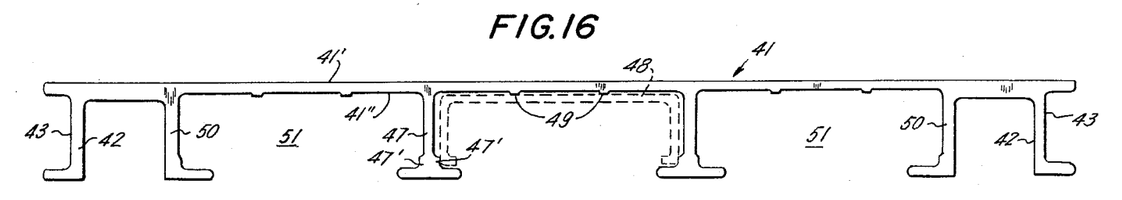
FIG. 16 is a side view of a form panel of relatively wide dimensions provided with T- and L-shaped reinforcing ribs.
Figure 19:
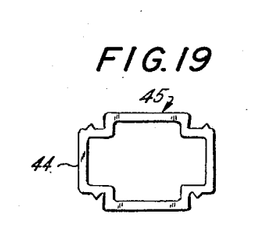
FIG. 19 is an end view of an adjustment or widening or enlarging section.
Figure 20:
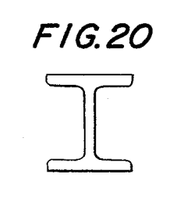
FIG. 20 is an end view of a double T-shaped connecting section corresponding to the section shown in FIG. 19.
Figure 21:
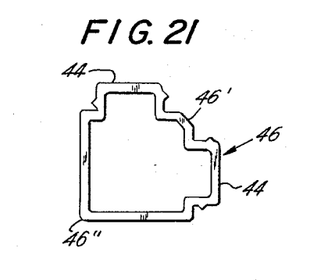
FIG. 21 is an end view of a corner rail formed as a hollow section.
Figure 23:
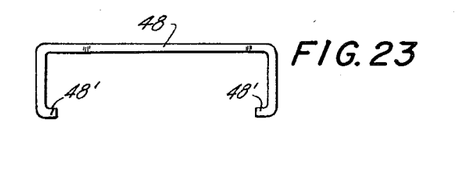
FIGS. 23 and 24 are two different embodiments of an insert section.

The form panel 41 shown in FIG. 16 also consists of an extruded section on an aluminum base. This form panel 41 as well as all the other form elements are coated on the side having the surface 41' which engages the hardening concrete with a thin layer of a non-adhering material, such as Araldit, for example. The plate 41 is provided with bifurcated section rails 42 along its longitudinal edge defining an elongated groove 43 in which the border rails 44 of the correspondingly fabricated connecting section rails, for example the widening sections 45 shown in FIG. 19 or the corner sections 46 shown again in FIG. 21, are able to be inserted in the manner of a tongue-and-groove connection. On the underside 41" facing away from the forming surface 41', the form panel or plate 41 is provided with several T-shaped reinforcing ribs 47 extending in the longitudinal direction, whose height as shown in FIG. 16 corresponds to that of the bifurcated section rails 42. Substantially U-shaped insert sections 48 as shown in FIG. 23 are insertable between respectively two T-shaped reinforcing ribs 47, as is shown by the broken lines in FIG. 16. In order to facilitate the insertion and the withdrawal of the insert sections 48, slightly projecting glide rails 49 or 47' are provided on the underside 41" of the form plate 41 as well as also on their T-shaped reinforcing ribs 47 which ensure an essentially linear contact of the insert section 48 with the form plates. In the vicinity of the bifurcated section rails 42 there are also provided L-shaped reinforcing ribs 50 for the form plates 41 shown in FIG. 16, the L-shaped ribs 50 forming, with the adjacent T-shaped reinforcing ribs 47, corresponding insert compartments. The insert sections 48 are provided at their lower side ends, as shown in FIG. 23, with longitudinal edges 48' projecting slightly toward the inside, which affords a better guide and seat or contact with the lower flange portion of the reinforcing ribs 47 or 50.

Figure 17:
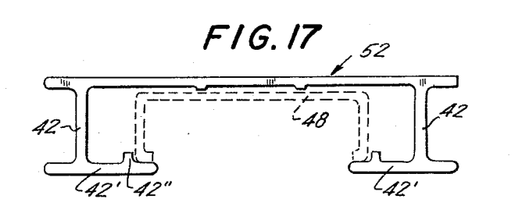
FIG. 17 is a side view of a form panel of relatively narrow dimensions.

For the form plate 52 shown in FIG. 17, which has a relatively narrow width, there are provided at both bifurcated section rails 42, section elongations forming reinforcing ribs 42' extending toward the interior, on which similarly slightly projecting gliding rails 42' are provided for guiding an insert section 48 to be inserted therebetween. The insert sections 48 can selectively be employed as reinforcing or extension sections. In the latter case, they can form a connection for pairs of form plates 41 or 52 lying one behind the other in the longitudinal direction, whereby the insert sections 48 are located at the level of the abutting joint of the form plates that are to be connected to one another, i.e. the insert sections extend on both sides of the butt joint and therefore afford a secure connection in the longitudinal direction.

The corner rail 46 shown in FIG. 21 has a many-sided single chamber hollow section construction including an inclined inner edge 46' of the form and an outer edge 46" of the form. The essentially L-shaped hollow section 46 can be inserted with its marginal ledges or rails 44 in the bifurcated section grooves 43 of the form plates 41 or 52, to form a tongue-and-groove connection therewith.

Figures 18, 22:
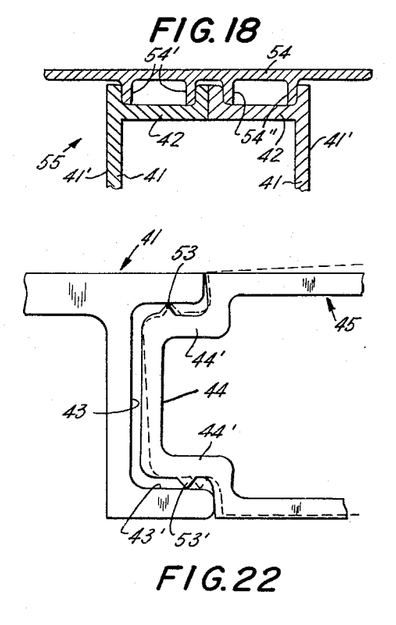
FIG. 18 shows in vertical cross section a form holder or carrier consisting of two form panels placed side to side and a support section connecting the latter one to the other.
FIG. 22 is an enlarged end view of a tongue-and-groove connection between the section of FIG. 19 and the panel of FIG. 16.

In order to facilitate or improve the insertion of the marginal ledges 44 provided on the section rails 45 and 46 into the bifurcated section grooves 43, there are provided, according to FIG. 22, on the side flanks 44' of the marginal ledges, wedge-shaped clamping ribs 53, 53' which are arranged staggered somewhat with respect to each other in the manner shown in FIG. 22. The insertion takes place in such a way that the form elements, for example the form plates 41 and the widening section 45 which are to be connected to one another, are first placed against each other at a small angle as is indicated by the broken lines of the widening section 45 in FIG. 22. Then the parts 41 and 45 are pressed into the position of these parts 41 and 45, shown in solid lines in FIG. 22, whereby the clamping ribs 53, 53' slide along the bifurcated section groove 43 in engagement with the side flanks 43'. Consequently, there is a firm linear clamping contact between both portions 41 and 45. Not only is a secure connection effected between the afore-described parts 41 and 45 in this manner, but also the advantage is simultaneously obtained that the clamping connection is not impaired by dirt or concrete deposits found in the bifurcated section groove 43 or at the border rails 44.

In FIG. 18, there is shown how two form plates, for example of the type shown in FIG. 16, can be united in an adjacent and edgewise arrangement as by the support section 54 located above both plates or panels 41 and connecting them with one another to form a form box holder or carrier 55. The support section 54 is provided for this purpose with insert rails 54' or 54" in the form of comb-like teeth on the underside thereof, and which respectively grip and hold the bifurcated section rails 42 of the form plates 41 pairwise together. In a similar manner, the rails provided on the support section 54 can also be arranged so that they grip and surround the bifurcated section rails 42 on the outside thereof without extending into the grooves of the bifurcated sections. In such case, the rails can be additionally clamped. It is understood that the form plates 41 varying from the illustrated arrangement can also be arranged with their forming surfaces 41' located next to one another so that essentially then a T- or double-T-shaped form holder is produced. In order to obtain form holders of larger longitudinal extension, several of such form plates lying pairwise next to one another and also one behind the other can be arranged and connected with one another by means of the corresponding insertable insert sections 48 according to FIG. 23. There can accordingly then also be used several support sections 54 arranged so that they lie one behind the other, which advantageously extend across or bridge the butt joints of the form plates, so that a good longitudinal bracing or bending with a continuous smooth support surface is produced.

Figure 24:
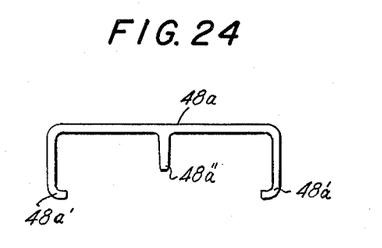
Figure 25:
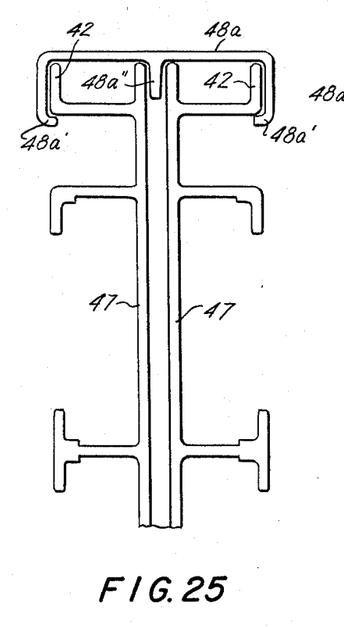
FIGS. 25 and 26 show two different embodiments of form holders constructed from respectively two different form plates or panels held together respectively by one and by two of the insert sections shown in FIG. 24.
Figure 26:
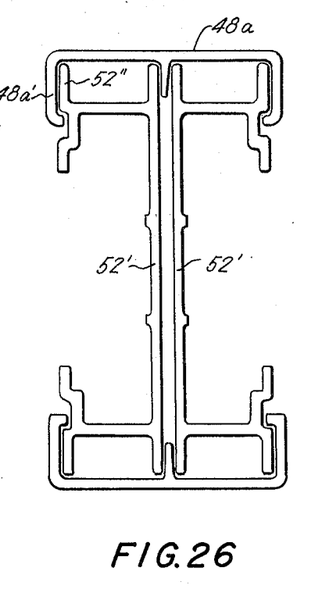
Figure 27:
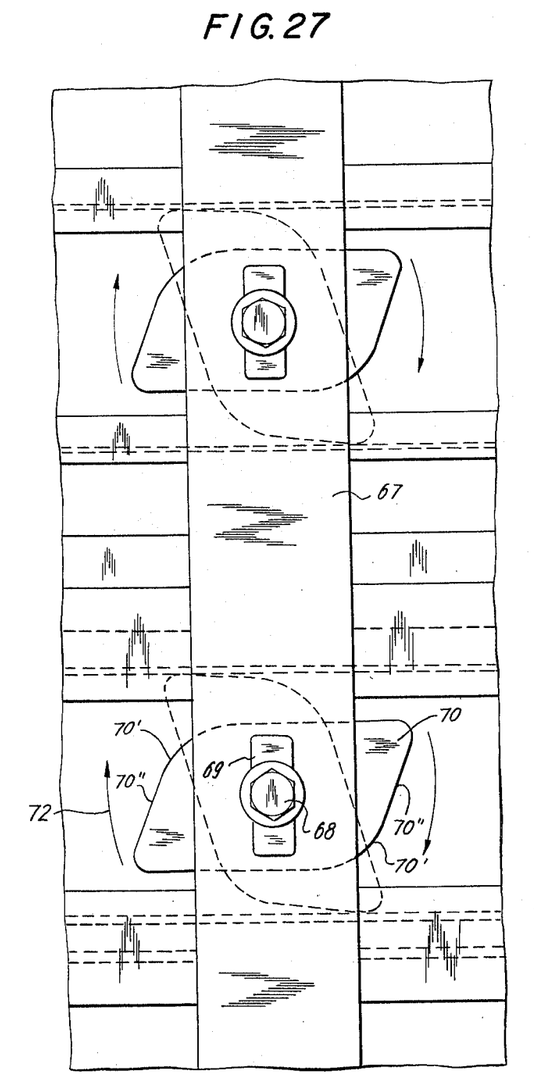
FIGS. 27 and 28 show a front and a side view respectively of a formwork assembly held together by means of a flat rail with nuts having a parallelogram shape threaded on a screw bolt.
Figure 28:
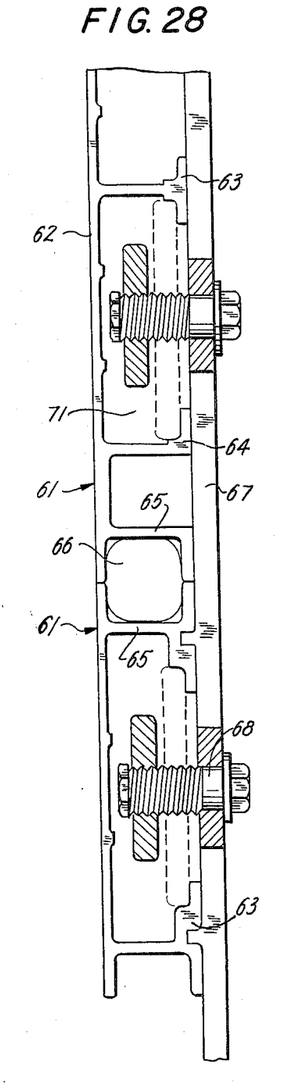

An even more advantageous connection of several form plates or panels 41 or 52' to a form holder is shown in FIGS. 25 and 26 wherein the connection concerned is produced by means of the substantially U-shaped insert section 48a according to FIG. 24 instead of with the support rail 54 shown in FIG. 18. For holding the plates 41 or 52' spaced from one another the insert section 48a is provided with a spacing rib 48a" in the middle thereof. Instead of this spacing rib 48a" there can, however, also be employed when using the insert section 48 shown in FIG. 23, a loose or separate fitting or part of suitable thickness that is inserted between the plates or panels 41 or 52'. The insert sections 48 or 48a surround and grip the T- or L-shaped marginal rails 42 or 52" respectively with their shank ends 48' or 48a', whereby a secure tie of the thus constructed form holder is effected. In addition, the use of the insert sections 48 or 48a here affords the advantageous possibility of inserting such an assembled form holder at a desired location in the insert compartments 51 located in the form plates such as for example 41, whereby an additional bracing or stiffening of for example the ceiling beams, large flat wall forms or the like is rendered possible. The form rail or ceiling surfaces shown in FIGS. 27 and 28 are assembled from several form plates 61 consisting of aluminum-extruded sections. On the underside lying opposite the forming surface 62, the form plates 61 are provided with T- and L-shaped reinforcing ribs 63 or 64. At their butt locations opposite one another, the form plates 61 are provided with a bifurcated section 65 between which a deformable rubber or plastic solid section 66 is inserted as a sealing strip.

For clamping the opposite sides and simultaneously reinforcing the form plate 61, one or more longitudinal rails 67 are employed here that are provided with screw bolts 68 displaceably mounted in the elongated holes 69 of the flat rails. On the ends of the screw bolts 68 facing the form plates 61 there is seated respectively a nut 70 having a parallelogram shape (shown as a rhomboid in the figure) which is rounded at its corners 70' lying opposite one another across the shorter diagonal thereof. For securing the flat rail 67, the parallelogram nuts 70 are inserted in the position shown by the solid lines in FIGS. 27 and 28 in the insert compartments 71 between respectively two adjacent reinforcing ribs 63 or 63–64. Thereafter, the parallelogram nuts 70 are turned about the screw bolt axis in the direction indicated by the arrows 72, until they are placed with their more widely spaced opposite-lying parallel sides 70'' behind or against the extending flange of the reinforcing ribs 63 or 64, as is shown by the broken lines in FIGS. 27 and 28. Then the screw bolts 67 are securely tightened. In most cases the afore-mentioned turning of the parallelogram nut 70 by hand can be dispensed with, since the nuts assume the dotted-line position by themselves when they are tightened on the screw bolts 68, namely due to corresponding friction with the bolts 68. After tightening, the screw bolts 68 and the parallelogram nuts 70 located in the broken-line position of FIGS. 27 and 28 provide an exceptionally secure and firm clamping of the form plates 61 across the flat rail section 67 which can extend over as many lengths as desired. When the formwork is to be dismantled, only the screw bolts 68 have to be loosened and the parallelogram nuts 70 turned back to the solid-line positions shown in FIGS. 27 and 28. By means of the parallelogram-shaped construction of the screw nut 70, not only is the insertion thereof in the insert compartment 71 and the gripping thereby of the reinforcing ribs 63 and 64 simplified or rendered possible, but also there is simultaneously afforded that the nuts 70 when tightened on the screw bolts 68 do not swing outwardly over the clamping position shown by the dotted lines, whereby its assembly is essentially simplified. Since the opposite more widely spaced parallel sides 70'' of the screw nuts 70 can be simultaneously pressed firmly against the flange of the reinforcing ribs 63 and 64 of the form plates 61, the flat rail 67 is additionally secured against displacement in the longitudinal direction, which also serves in a similar manner to hold together the form plates 61.

Figures 29, 30, 31:
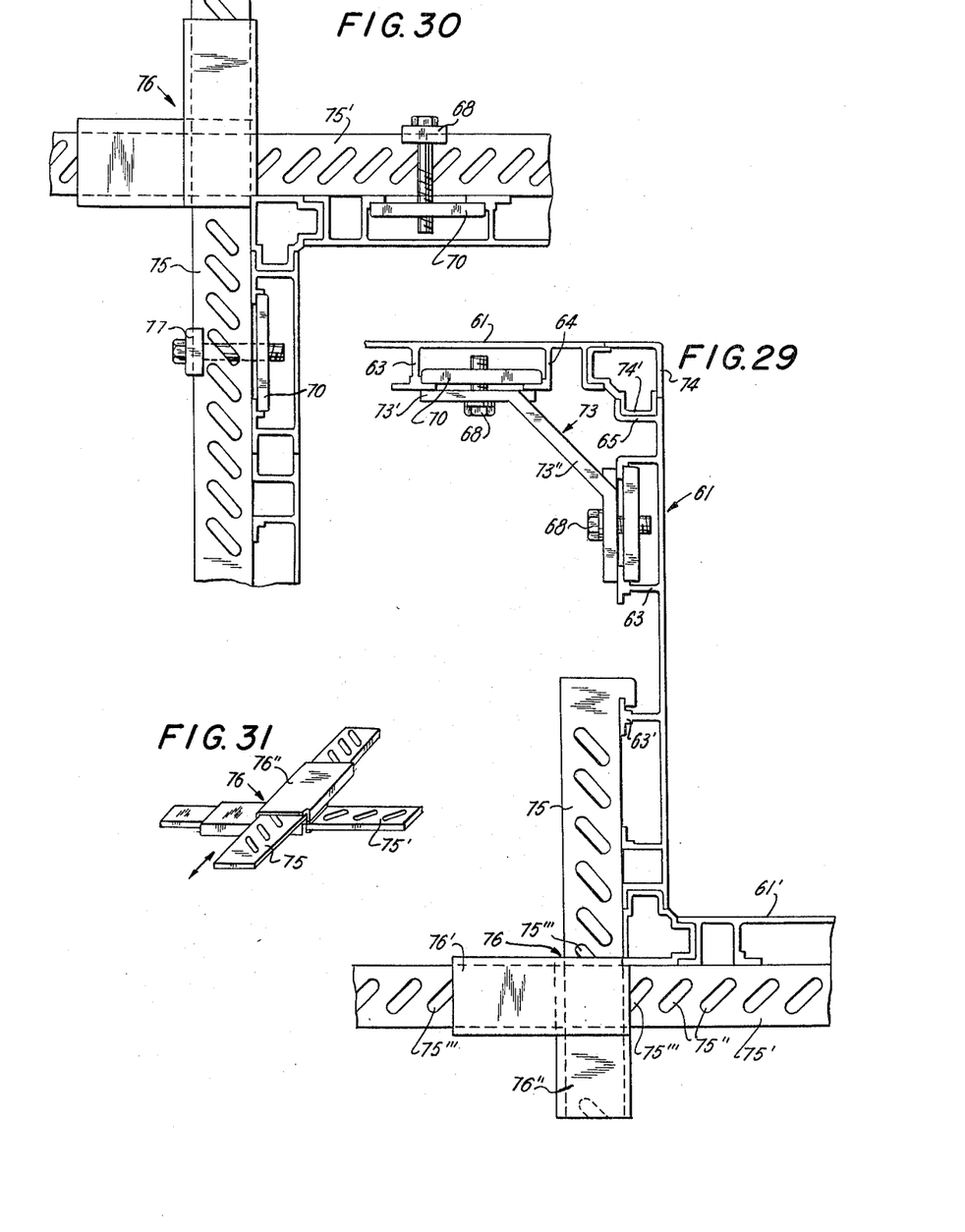
FIG. 29 is a vertical cross section of a ceiling beam formwork held together by holding clamps and elongated force transferring members.
FIG. 30 is a horizontal cross section of a formwork for a column or support corner.
FIG. 31 is a perspective view of a cross piece for two clamps.

In the embodiment shown in FIG. 29, representing the formwork for a ceiling beam, the support clamps 73 provided with the screw bolts 68 and the parallelogram nuts 70 are constructed as angle or corner section pieces or rails. It essentially has a bent-apart C-outline, which consists of two section shanks 73' and a section shank 73'' connecting the latter together to one another, from which the section shank 73' respectively is bent away through an inclination of 45°. Also in this case the parallelogram nuts 70 grip behind the T- and L-shaped reinforcing ribs 63 and 64 of the form plates 61. The latter are additionally also connected with one another by the hollow corner section 74, which is in gripping engagement in the bifurcated section 65 of the plates 61 with its correspondingly formed border layers 74' by means of a tongue-and-groove connection.

For clamping together the lower form plates 61' of the ceiling beam form there are suspended elongated force-transferring members 75 on both sides of the beam form plates 61 which extend perpendicularly from the T-shaped reinforcing ribs 63', the members 75 being connected by the cross-pieces 76 with the transverse force-transferring members 75' bracing the lower form plates 61'. These cross pieces 76, as can also be seen in FIGS. 30 and 31, consist respectively of two sleeves or pockets 76', 76'' through which the force-transferring members respectively extend, these pockets being connected to one another firmly and lying above one another, and being arranged at a suitable intersecting angle of both the members 75, 75' with respect to one another. Customarily, both sleeves form a right angle with one another as is shown in the figures. For specific situations the sleeves can also, however, be arranged with respect to one another at a different intersecting angle. The rod members 75, 75', usually provided with inclined elongated holes 75'', are secured at their ends extending out of the sleeves 76' or 76'' by means of wedges 75''' that are driven into the related inclined holes to prevent longitudinal displacement thereof.

For the supporting or column form shown in FIG. 30, the force-transferring members 75, 75' are again secured with the help of screw bolts 68 by parallelogram nuts 70 to the form plates 61. For this purpose, the screw bolts 68 are provided at their heads with suitably formed holding claws 77 which grip the clamps 75, 75' on the outside and thereby press them firmly against the form plates 61.

Figure 32:
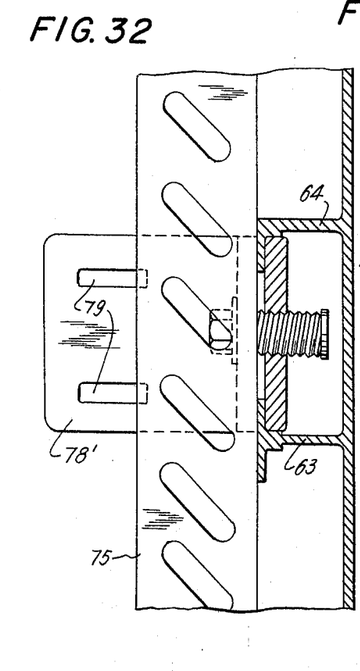
FIGS. 32 and 33 are front and side views respectively, partly in section, of a clamping device securing and supporting an angle section rail and provided with a nut having a parallelogram shape and an insert wedge.
Figure 33:
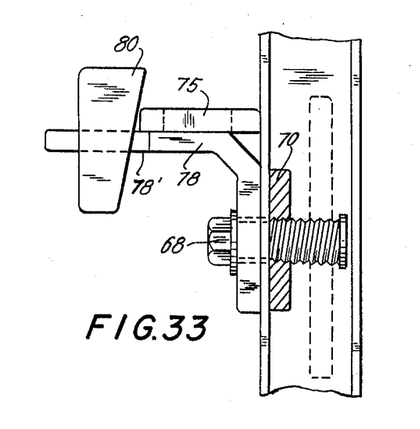

For the embodiment according to FIGS. 32 and 33, the support clamps with the screw bolts 68 and the parallelogram nuts 70 are formed as angle sections 78 which in the afore-described manner are secured to the reinforcing rib sections 63, 64 of the form plates 61. On their front shank 78', the angle sections 78 are provided with elongated holes 79 through which wedges 80 are insertable and by means of which the force-transferring member 75 lying on the bent shank 78' is braced or secured.

Figure 13:
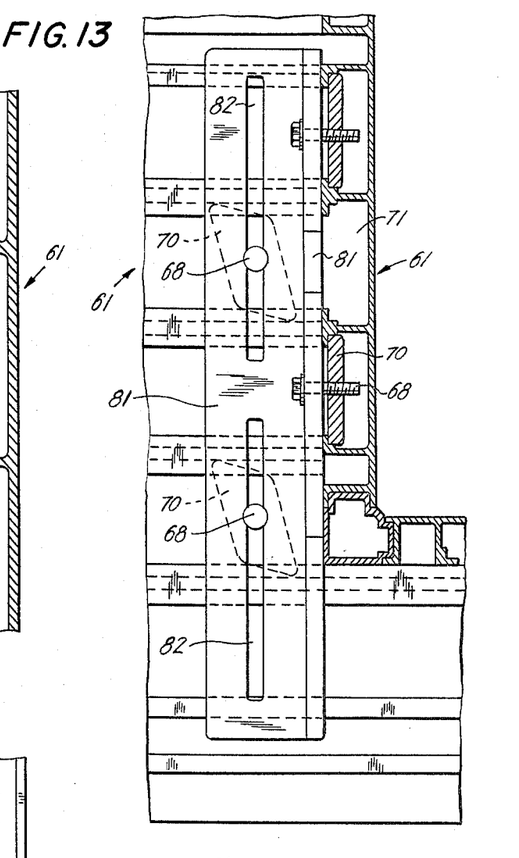
FIGS. 13 and 14 are front and side views respectively of two ceiling beam forms abutting at right angles and an angle section rail as a connecting piece therebetween provided with several screw bolts and nuts shaped as parallelograms.
Figure 14:
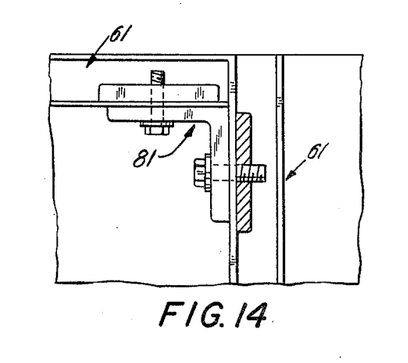

For the embodiment shown in FIGS. 13 and 14, the support clamp provided with the screw bolts 68 and the parallelogram nuts 70 is formed as an angle section rail 81 in whose elongated slots 82 the screw bolts 68 are mounted for longitudinal displacement. In the embodiment of FIGS. 13 and 14, the form plates 61, forming a pair of ceiling beams meeting with one another at right angles, are assembled. Since the parallelogram nuts also in this embodiment are in gripping engagement with or behind the T- or L-shaped reinforcing ribs 63 and 64 of the form plates 61, an exceptionally solid corner connection is afforded over the angle section rail 81, and is both exceedingly simple to connect and to dismantle. The elongated slots 82 provided in the angle section rail 81 ensure that the corner angle connection can also be effected when the reinforcement section or the insert compartment 71 of the engaging form plates closed by them are not aligned with one another but are rather displaced from one another.

It is understood, of course, that the novel form sections of this invention can be made not only by extrusion presses but also, if necessary, by casting or drawing or corresponding working or deforming, although the extrusion press, for the aforedescribed reasons, is more advantageous.

I claim:

1. Assemblable formwork for reinforced concrete structures comprising form elements including form panels and connecting rails, each of said form elements having at least two opposite parallel edges and, when assembled in the formwork, a first side having a continuous smooth surface engageable with the forming concrete and consisting of a material adapted to resist cohesion of the concrete thereto, and a second side opposite to said first side and being free from engagement with the concrete being formed, a support ledge extending from said second side of said form elements at each of said edges, each support ledge forming with the respective form element a bifurcated section and defining with said form element an elongated groove having sides intersecting at an angle greater than an acute angle, an intermediate member removably insertable in the elongated grooves of the bifurcated sections of a pair of adjacent form elements in loose-fitting flush engagement with the sides of said groove, said intermediate member being located only on said second side of said adjacent form elements, and clamp means also located on said second side of said adjacent form elements for clamping together the bifurcated sections of said adjacent form elements and said intermediate member therebetween so as to join said adjacent form elements edgewise to one another.

2. Assemblable formwork according to claim 1 wherein the form elements consist of extruded sections on an aluminum base, said smooth surface on said first side of said form elements being coated with a layer of a substance noncoherent with the concrete being formed.

3. Assemblable formwork according to claim 1, wherein the form elements on said second side thereof are provided with T-shaped reinforcing ribs between which a substantially U-shaped insert section is receivable.

4. Assemblable formwork according to claim 1, wherein sealing strips of deformable material are inserted in the elongated grooves between the abutting edges of said adjacent form elements.

5. Assemblable formwork for reinforced concrete structures comprising form elements including form panels and connecting rails, each of said form elements having at least two opposite parallel edges and, when assembled in the formwork, a side free from engagement with the concrete being formed, a support ledge extending from said side of said form elements at each of said edges, each support ledge associated with said form panels forming with the respective form panel a bifurcated section and defining with said form panel an elongated groove, the support ledges of said connecting rails being located along said opposite edges thereof and being insertable respectively in the grooves of bifurcated sections of a pair of adjacent form panels in tongue and groove fashion, and clamp means for clamping together the bifurcated sections of said adjacent panels and the connecting rail therebetween so as to join said form panels edgewise one to the other, at least one of said form panels is a corner panel section having an angular cross section and formed with a hollow rib, said rib having recesses provided therein, and bracket means having projections insertable in said recesses for suspending said bracket means therefrom.

6. Assemblable formwork for reinforced concrete structures comprising form elements including form panels and connecting rails, each of said form elements having at least two opposite parallel edges and, when assembled in the formwork, a side free from engagement with the concrete being formed, a support ledge extending from said side of said form elements at each of said edges, each support ledge associated with said form panels forming with the respective form panel a bifurcated section and defining with said form panel an elongated groove, the support ledges of said connecting rails being located along said opposite edges thereof and being insertable respectively in the grooves of bifurcated sections of a pair of adjacent form panels in tongue and groove fashion, clamp means for clamping together the bifurcated sections of said adjacent panels and the connecting rail therebetween so as to join said form panels edgewise one to the other, said form panels on said side free from engagement with the concrete being formed having T-shaped reinforcement ribs, glide rails provided on said side and on said ribs extending parallel to said ribs, and substantially U-shaped insert sections being insertable between said T-shaped ribs in sliding linear engagement with said glide rails, a bifurcated section and a T-shaped rib defining a space therebetween, a reinforcing rib being located in said space adjacent said bifurcated section and formed with a glide rail, said reinforcing rib and said T-shaped rib defining an insert compartment for slidingly receiving said insert section.

7. Assemblable formwork for reinforced concrete structures comprising form elements including form panels and connecting rails, each of said form elements having at least two opposite parallel edges and, when assembled in the formwork, a side free from engagement with the concrete being formed, a support ledge extending from said side of said form elements at each of said edges, each support ledge associated with said form panels forming with the respective form panel a bifurcated section and defining with said form panel an elongated groove, the support ledges of said connecting rails being located along said opposite edges thereof and being insertable respectively in the grooves of bifurcated sections of a pair of adjacent form panels in tongue and groove fashion, clamp means for clamping together the bifurcated sections of said adjacent panels and the connecting rail therebetween so as to join said form panels edgewise one to the other, at least two of said form panels being in side by side engagement so that the support ledge of one form panel laterally abuts that of the other, and a support member having a support side and at least two laterally extending projections having a predetermined spacing so that said laterally extending projections are insertable respectively in the grooves of the bifurcated sections of said form panels, said form panels and said support member together forming a form carrier.

8. Formwork according to claim 7 wherein said support member is horizontally disposed, and a plurality of comb tooth-like projections laterally extend from the underside of said support member, said projections abutting against and frictionally gripping the sides of the grooves of said bifurcated sections.

9. Assemblable formwork for reinforced concrete structures comprising form elements including form panels and connecting rails, each of said form elements having at least two opposite parallel edges and, when assembled in the formwork, a side free from engagement with the concrete being formed, a support ledge extending from said side of said form elements at each of said edges, each support ledge associated with said form panels forming with the respective form panel a bifurcated section and defining with said form panel an elongated groove, the support ledges of said connecting rails being located along said opposite edges thereof and being insertable respectively in the grooves of bifurcated sections of a pair of adjacent form panels in tongue and groove fashion, clamp means for clamping together the bifurcated sections of said adjacent panels and the connecting rail therebetween so as to join said form panels edgewise one to the other, said form panels on said side free from engagement with the concrete being formed having a plurality of parallel reinforcement ribs, at least two adjacent ribs having lateral extensions respectively at their free ends, said lateral extensions being directed toward one another, said clamp means comprising at least one clamping plate member formed with a bore, a screw bolt, having a head at one end, extending through said bore, a nut of unequal-sided parallelogram-shape threaded on said bolt, said clamping plate abutting the free ends of said reinforcement ribs, the longest dimension of said nut overlapping the lateral extensions of said adjacent ribs, said nut being turnable about the axis of said screw bolt into abutting engagement with said lateral extensions for clamping said form panel to said clamping plate member.

10. Formwork according to claim 9 wherein said parallelogram-shape is a rhomboid and the closer diagonally spaced corners are rounded.

11. Formwork according to claim 9 wherein the bore formed in said clamping plate member is elongated and said screw bolt is displaceably mounted therein.

12. Formwork according to claim 9 wherein said clamping plate member is a flat rail.

13. Formwork according to claim 9 wherein said clamping plate member is an angular rail.

14. Formwork according to claim 9 wherein elongated force transferring means rigid with said clamping plate member are provided for spanning a plurality of form panels fitted together.

15. Formwork according to claim 9 wherein said force transferring means comprises at least two elongated rods crossing at least at right angles to each other, said rods extending through a pair of sleeves respectively, said sleeves being located one above the other and firmly secured to each other at said angle.

References Cited by the Examiner

UNITED STATES PATENTS

| | | | |
|---|---|---|---|
| 291,032 | 1/1884 | Cleland | 52—282 |
| 760,974 | 5/1904 | Dyarman et al. | 52—282 |
| 894,549 | 7/1908 | Tufts | 249—192 |
| 1,217,416 | 2/1917 | Colt | 249—47 |
| 1,527,551 | 2/1925 | Hollis | 249—45 |
| 2,602,210 | 7/1952 | Rumble | 249—192 |
| 2,676,680 | 4/1954 | Kindorf | 52—710 |
| 3,146,497 | 9/1964 | Short et al. | 52—282 |

FOREIGN PATENTS

| | | |
|---|---|---|
| 219,032 | 12/1958 | Australia. |
| 605,806 | 9/1960 | Canada. |
| 841,722 | 6/1952 | Germany. |
| 835,260 | 5/1960 | Great Britain. |

J. SPENCER OVERHOLSER, *Primary Examiner.*

G. A. KAP, *Assistant Examiner.*